US012626626B2

(12) United States Patent
Kim

(10) Patent No.: US 12,626,626 B2
(45) Date of Patent: May 12, 2026

(54) GATE DRIVER CIRCUIT AND TRANSPARENT DISPLAY DEVICE INCLUDING THE SAME

(71) Applicant: LG Display Co., Ltd., Seoul (KR)

(72) Inventor: Binn Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 194 days.

(21) Appl. No.: 18/541,069

(22) Filed: Dec. 15, 2023

(65) Prior Publication Data

US 2024/0212548 A1 Jun. 27, 2024

(30) Foreign Application Priority Data

Dec. 22, 2022 (KR) ........................ 10-2022-0181500

(51) Int. Cl.
*G09G 3/20* (2006.01)

(52) U.S. Cl.
CPC ....... *G09G 3/20* (2013.01); *G09G 2300/0413* (2013.01); *G09G 2300/0426* (2013.01); *G09G 2310/0286* (2013.01); *G09G 2310/061* (2013.01); *G09G 2330/021* (2013.01); *G09G 2354/00* (2013.01)

(58) Field of Classification Search
CPC ............. G09G 3/20; G09G 2300/0413; G09G 2300/0426; G09G 2310/0286; G09G 2310/061; G09G 2330/021; G09G 2354/00; G09G 3/3677; G09G 3/2077; G09G 3/3208; G09G 3/36; G09G 3/3266; G09G 3/3674; G09G 2310/0267; G09G 2320/043
See application file for complete search history.

(56) References Cited

U.S. PATENT DOCUMENTS

| | | | | |
|---|---|---|---|---|
| 10,186,203 | B2 | 1/2019 | Park et al. | |
| 2009/0109161 | A1* | 4/2009 | Yamamoto | G11C 19/00 345/100 |
| 2011/0157263 | A1* | 6/2011 | Kim | G09G 3/3677 345/698 |
| 2012/0038616 | A1* | 2/2012 | Song | G09G 3/003 345/212 |
| 2017/0178559 | A1* | 6/2017 | Kim | G11C 19/28 |
| 2022/0383821 | A1* | 12/2022 | No | G11C 19/184 |

FOREIGN PATENT DOCUMENTS

| | | | | |
|---|---|---|---|---|
| EP | 1160796 | A2 * | 12/2001 | G09G 3/3677 |
| EP | 2445108 | A1 * | 4/2012 | G09G 3/3677 |
| KR | 10-2329977 | B1 | 11/2021 | |

* cited by examiner

*Primary Examiner* — Bryan Earles
(74) *Attorney, Agent, or Firm* — Fish & Richardson P.C.

(57) ABSTRACT

A gate driver circuit capable of preventing multiple outputs of a dummy stage to prevent malfunction thereof due to deterioration of an element, and a display device including the gate driver circuit. The gate driver circuit includes a plurality of stages for driving a plurality of gate lines, wherein the plurality of stages include: an X-th stage configured to output a carry signal and at least one gate signal; and a dummy stage configured to output a dummy carry signal to the X-th stage in response to the carry signal, wherein the dummy stage is configured to reset the dummy stage in response to the dummy carry signal.

21 Claims, 11 Drawing Sheets

GATE DRIVER CIRCUIT AND TRANSPARENT DISPLAY DEVICE INCLUDING THE SAME

CROSS-REFERENCE TO RELATED APPLICATION

This application claims the priority of Korean Patent Application No. 10-2022-0181500 filed on Dec. 22, 2022, which is hereby incorporated by reference in its entirety.

BACKGROUND

Field of the Disclosure

The present disclosure relates to a display device, and more particularly, to a gate driver circuit, and a transparent display device including the gate driver circuit.

Description of the Background

As the information society develops, the demand for display devices to display images is increasing in various forms. Thus, various display devices such as liquid crystal display devices and organic light-emitting display devices are being utilized.

The display device includes a data driver circuit that supplies data signals to data lines of a display panel and a gate driver circuit that sequentially supplies gate signals to gate lines of a display panel.

Recently, as the display device is increasingly thinner, a scheme to embed the gate driver circuit together with a pixel array into a display panel is being developed. The gate driver circuit embedded in the display panels is referred to as a GIP (Gate In Panel) driver circuit.

SUMMARY

The gate driver circuit is composed of a shift register having a plurality of stages to sequentially output a gate signal.

A transparent display panel may be cuttable. When the transparent display panel is cut, the gate driver circuit built into the panel is also cut. When manufacturing a cuttable panel, last two stages among a plurality of stages serve as dummy stages to reset a previous stage.

However, since the dummy stage cannot be reset in cutting of the transparent display panel, multiple outputs may occur in the dummy stage during operation of the gate driver circuit. The multi-output of the dummy stage applies an excessive gate bias to a transistor of a reset circuit of the previous stage, thus causing deterioration of the element, which causes the gate driver circuit to malfunction.

Accordingly, the present disclosure is directed to a gate driver circuit and a transparent display device including the same that substantially obviate one or more of problems due to limitations and disadvantages described above.

More specifically, the present disclosure is to provide a gate driver circuit capable of preventing the multiple outputs of the dummy stage, and thus preventing malfunction due to deterioration of the element, and provide a transparent display device including the gate driver circuit.

The present disclosure is also to provide a gate driver circuit capable of preventing the multiple outputs of the dummy stage to secure stability of the gate driver circuit, and provide a transparent display device including the gate driver circuit.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

The present disclosure is not limited to the above-mentioned features. Other features and advantages according to the present disclosure that are not mentioned may be understood based on following descriptions, and may be more clearly understood based on aspects according to the present disclosure. Further, it will be easily understood that the advantages according to the present disclosure may be realized using means shown in the claims or combinations thereof.

To achieve these and other advantages and in accordance with the present disclosure, as embodied and broadly described, a plurality of stages for driving a plurality of gate lines, wherein each of the plurality of stages includes an X-th stage configured to output a carry signal and at least one gate signal; and a dummy stage configured to output a dummy carry signal to the X-th stage in response to the carry signal, wherein the dummy stage is configured to reset the dummy stage in response to the dummy carry signal.

In another aspect of the present disclosure, a gate driver circuit includes a (X−1)-th stage configured to output a (X−1)-th carry signal and at least one (X−1)-th gate signal; an X-th stage configured to output an X-th carry signal and at least one X-th gate signal; a first dummy stage configured to output a first dummy carry signal to the (X−1)-th stage in response to the (X−1)-th carry signal, and to reset the first dummy stage in response to the first dummy carry signal; and a second dummy stage configured to output a second dummy carry signal to the X-th stage in response to the X-th carry signal and to reset the second dummy stage in response to the second dummy carry signal.

In a further aspect of the present disclosure, a transparent display device includes a cuttable transparent display panel; and a gate driver circuit configured to drive gate lines of the display panel, wherein the gate driver circuit includes the gate driver circuit as described above.

According to various aspects of the present disclosure, the multiple outputs of the dummy stage may be prevented to prevent malfunction of the gate driver circuit due to deterioration of the element.

Further, a separate global reset line for resetting the stages is not required. Thus, a size of a bezel of the display panel may be reduced.

Further, no global reset line is required, such that interference noise may be reduced, thereby ensuring output stability.

A cuttable gate driver circuit in which multiple outputs of the dummy stage may be prevented to secure output stability, and the transparent display device including the cuttable gate driver circuit may be provided.

Further, a transmissive area of the transparent display panel in the transparent display device may be increased.

Further, multiple outputs of the dummy stage may be prevented such that the power consumption may be reduced, and thus the display panel may operate at low power.

Further, the cutting may allow the last stage of at least one of the stages of the gate driver circuit to be used as a dummy stage.

In addition to the above effects, specific effects of the present disclosure are described together while describing specific details for carrying out the present disclosure.

Effects of the present disclosure are not limited to the effects mentioned above, and other effects not mentioned will be clearly understood by those skilled in the art from the descriptions below.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
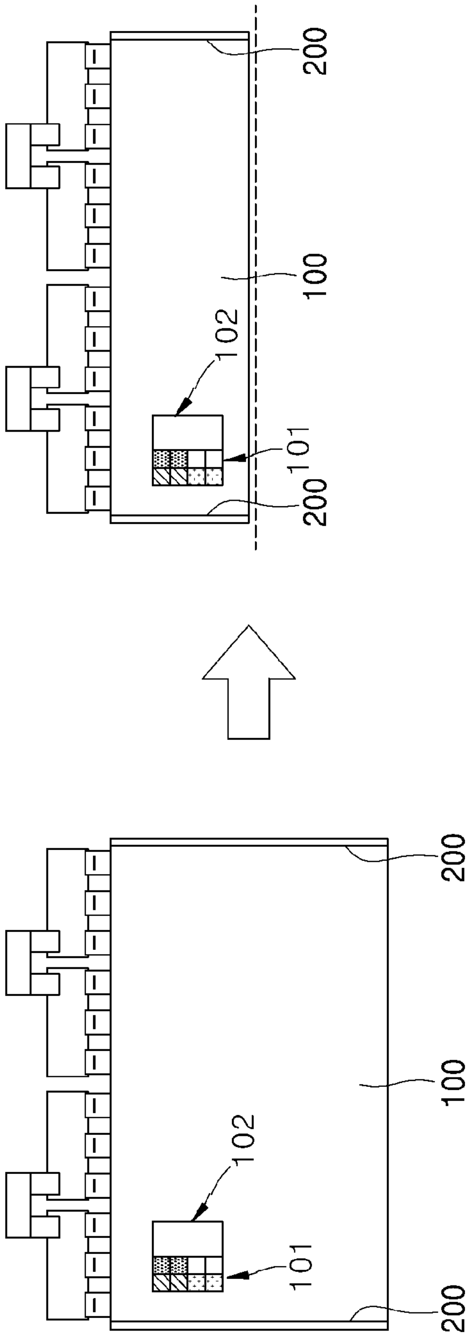
FIG. 1 is a diagram illustrating cutting of a cuttable transparent display panel in a transparent display device according to one aspect of the present disclosure.

Advantages and features of the present disclosure, and a method of achieving the advantages and features will become apparent with reference to aspects described later in detail together with the accompanying drawings. However, the present disclosure is not limited to the aspects as disclosed under, but may be implemented in various different forms. Thus, these aspects are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various aspects are illustrated and described further below. It will be understood that the description herein is not intended to limit the claims to the specific aspects described. On the contrary, it is intended to cover alternatives, modifications, and equivalents as may be included in the spirit and scope of the present disclosure as defined by the appended claims.

A shape, a size, a ratio, an angle, a number, etc. disclosed in the drawings for describing aspects of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular aspects only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as “after,” “subsequent to,” “before,” etc., another event may occur therebetween unless “directly after,” “directly subsequent” or “directly before” is not indicated.

When a certain aspect may be implemented differently, a function or an operation specified in a specific block may occur in a different order from an order specified in a flowchart.

For example, two blocks in succession may be actually performed substantially concurrently, or the two blocks may be performed in a reverse order depending on a function or operation involved.

It will be understood that, although the terms “first”, “second”, “third”, and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various aspects of the present disclosure may be partially or entirely combined with each other, and may be technically associated with each other or operate with each other. The aspects may be implemented independently of each other and may be implemented together in an association relationship.

In interpreting a numerical value, the value is interpreted as including an error range unless there is no separate explicit description thereof.

It will be understood that when an element or layer is referred to as being “connected to”, or “connected to” another element or layer, it may be directly on, connected to, or connected to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

The features of the various aspects of the present disclosure may be partially or entirely combined with each other, and may be technically associated with each other or operate with each other. The aspects may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, “aspects,” “examples,” “aspects, and the like should not be construed such that any aspect or design as described is superior to or advantageous over other aspects or designs.

Further, the term ‘or’ means ‘inclusive or’ rather than ‘exclusive or’. That is, unless otherwise stated or clear from the context, the expression that ‘x uses a or b’ means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for describing aspects.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

Hereinafter, a gate driver circuit and a transparent display device including the gate driver circuit according to some aspects will be described.

As used herein, each of a plurality of stages may be defined as a shift register that sequentially outputs gate signals to gate lines of a transparent display panel.

As used herein, an X-th stage may be positioned at a X-th position among a plurality of stages. A (X−1)-th stage, a (X−2)-th stage, and a (X−3)-th stage may be respectively positioned at a (X−1)-th position, a (X−2)-th position, and a (X−3)-th position among the plurality of stages. The X-th stage, the (X−1)-th stage, the (X−2)-th stage, and the (X−3)-th stage may be respectively denoted as GIP(X), GIP(X−1), GIP(X−2), and GIP(X−3).

FIG. 1 is a diagram illustrating cutting of a cuttable transparent display panel in a transparent display device according to one aspect.

Referring to FIG. 1, the transparent display device includes a transparent display panel 100 and a gate driver circuit 200 built into the transparent display panel 100. The transparent display panel 100 may be manufactured as a cuttable panel. When cutting the transparent display panel 100, the gate driver circuit 200 is also cut.

For example, various shapes and sizes of the transparent display device are required. The manufacturer may manufacture a display panel of a target shape and a target size by cutting the transparent display panel 100. In this way, when cutting the transparent display panel 100, the gate driver circuit 200 embedded therein is cut. Aspects to be described later may secure output stability and reliability by preventing the gate driver circuit 200 from malfunctioning when cutting the transparent display panel 100.

Figure 2:
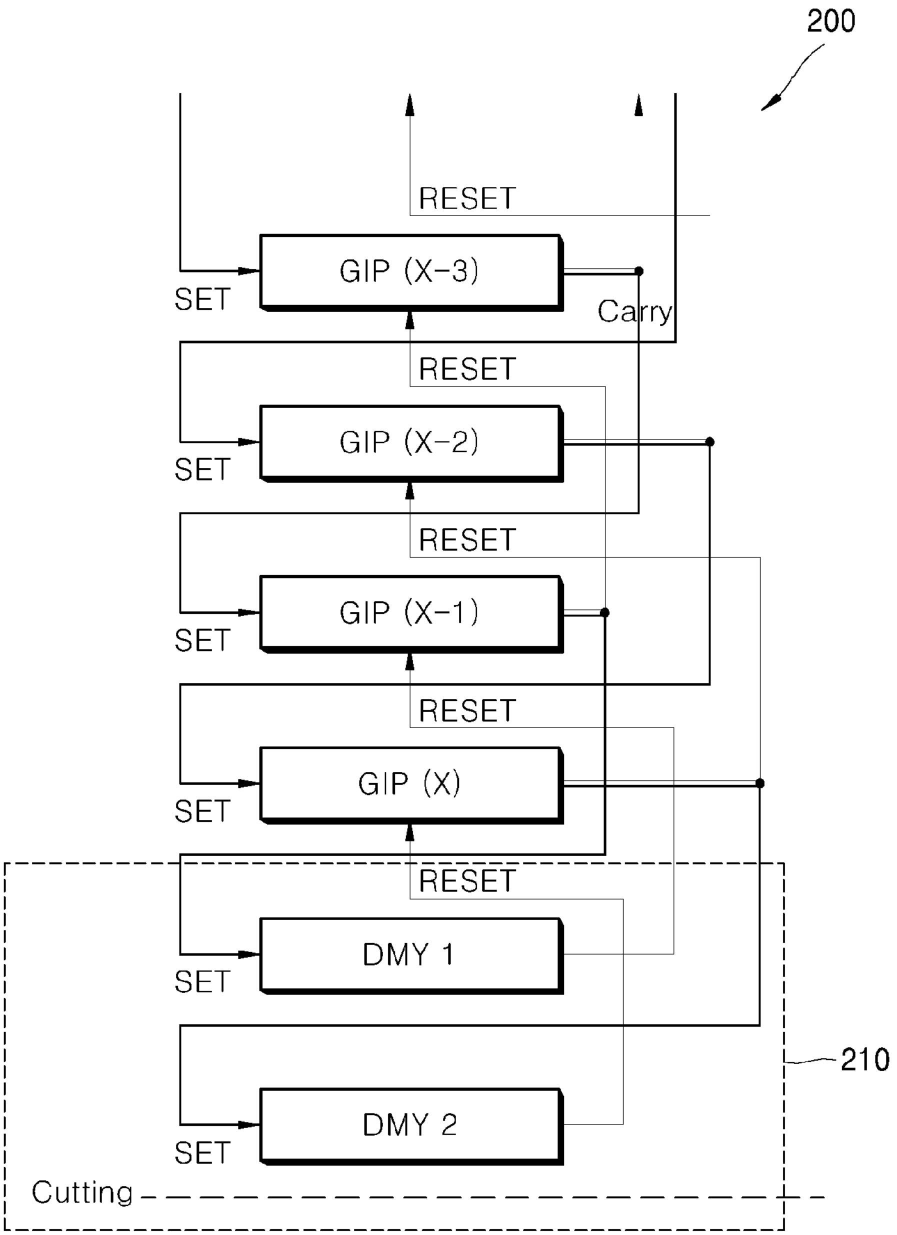
FIG. 2 is a block diagram of a gate driver circuit according to one aspect of the present disclosure.

The transparent display panel 100 may include a light-emitting area 101 and a transmissive area 102 in a display area. In the light-emitting area 101, a plurality of sub-pixels, for example, red, green, blue, and white sub-pixels may be disposed in the display area of the transparent display panel 100. In the transparent display panel 100, an area size of each of the light-emitting area 101 and the transmissive area 102 may be designed in consideration of light emission efficiency, and transparency. FIG. 2 is a block diagram of a gate driver circuit according to one aspect.

Referring to FIG. 2, the gate driver circuit 200 includes a plurality of stages GIP(X−3), GIP(X−2), GIP(X−1), and GIP(X), and a dummy stage circuit 210.

Each of the plurality of stages GIP(X−3), GIP(X−2), GIP(X−1), and GIP(X) outputs at least one gate signal and a carry signal. The carry signal may be used as a signal to set a Q node and a Qb node of a next stage, and may be used as a signal to reset a Q node of a previous stage.

The (X−3)-th stage GIP(X−3) outputs a set signal SET to the (X−1)-th stage GIP(X−1), and the (X−2)-th stage GIP (X−2) outputs the set signal SET to the X-th stage GIP(X). The set signal SET is used to set the Q node and the Qb node of each stage to a power voltage or a base voltage. Each of the stages outputs at least one gate signal in response to the set signal SET.

The (X−1)-th stage GIP(X−1) outputs a reset signal RESET to the (X−3)-th stage GIP(X−3) and outputs the set signal SET to a first dummy stage DMY1. The X-th stage GIP(X) outputs the reset signal RESET to the (X−2)-th stage GIP(X−2) and outputs the set signal SET to the first dummy stage DMY1. The reset signal RESET is used to reset the Q node of each stage to the base voltage. Each stage resets the Q node to the base voltage in response to the reset signal RESET.

The dummy stage circuit 210 outputs the carry signal. The carry signal from the dummy stage circuit 210 is used to reset the stages.

The first dummy stage DMY1 outputs the reset signal RESET to the (X−1)-th stage GIP(X−1), and s second dummy stage DMY2 outputs the reset signal RESET to the X-th stage GIP(X).

There is no stage in rear of each of the first dummy stage DMY1 and the second dummy stage DMY2. Thus, the Q node thereof is not reset. When the Q node thereof is not reset, the dummy stage may output multiple outputs.

Figure 3:
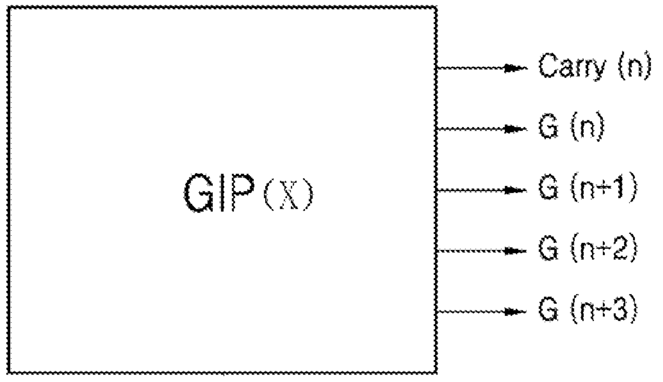
FIG. 3 is a block diagram showing a signal output from a stage of FIG. 2.
Figure 4:
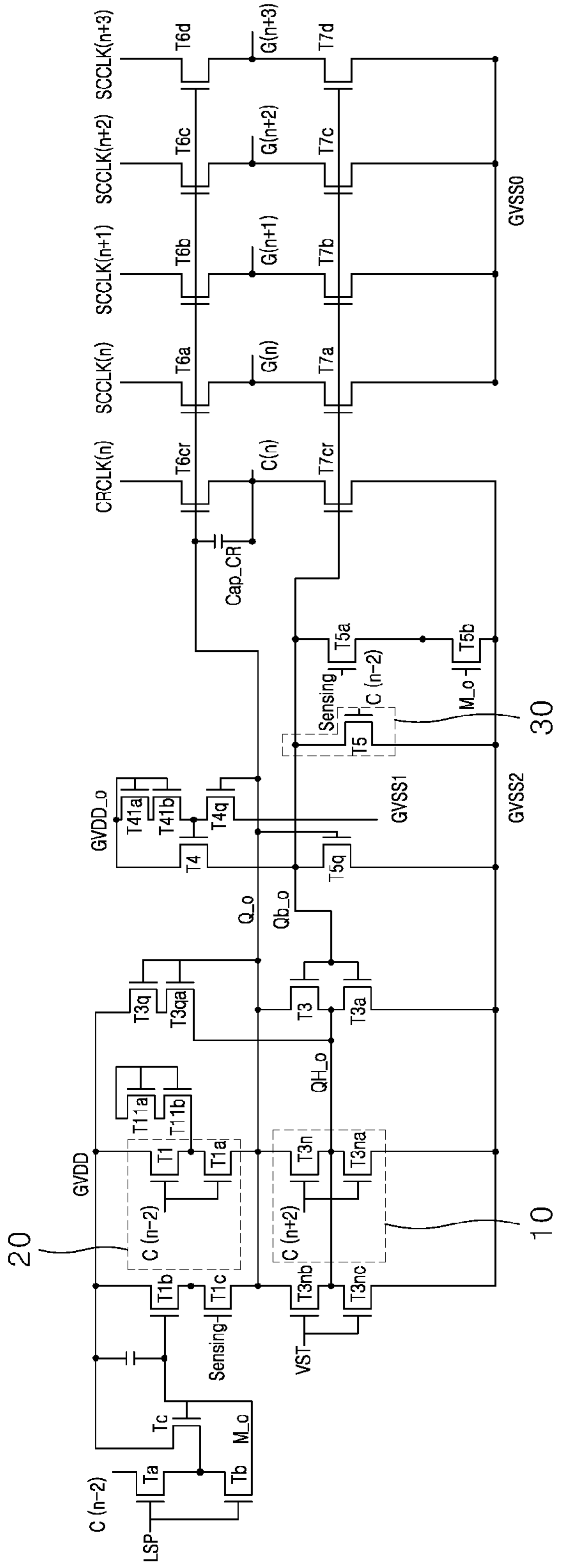
FIG. 4 is a circuit diagram of a stage in FIG. 3.
Figure 5:
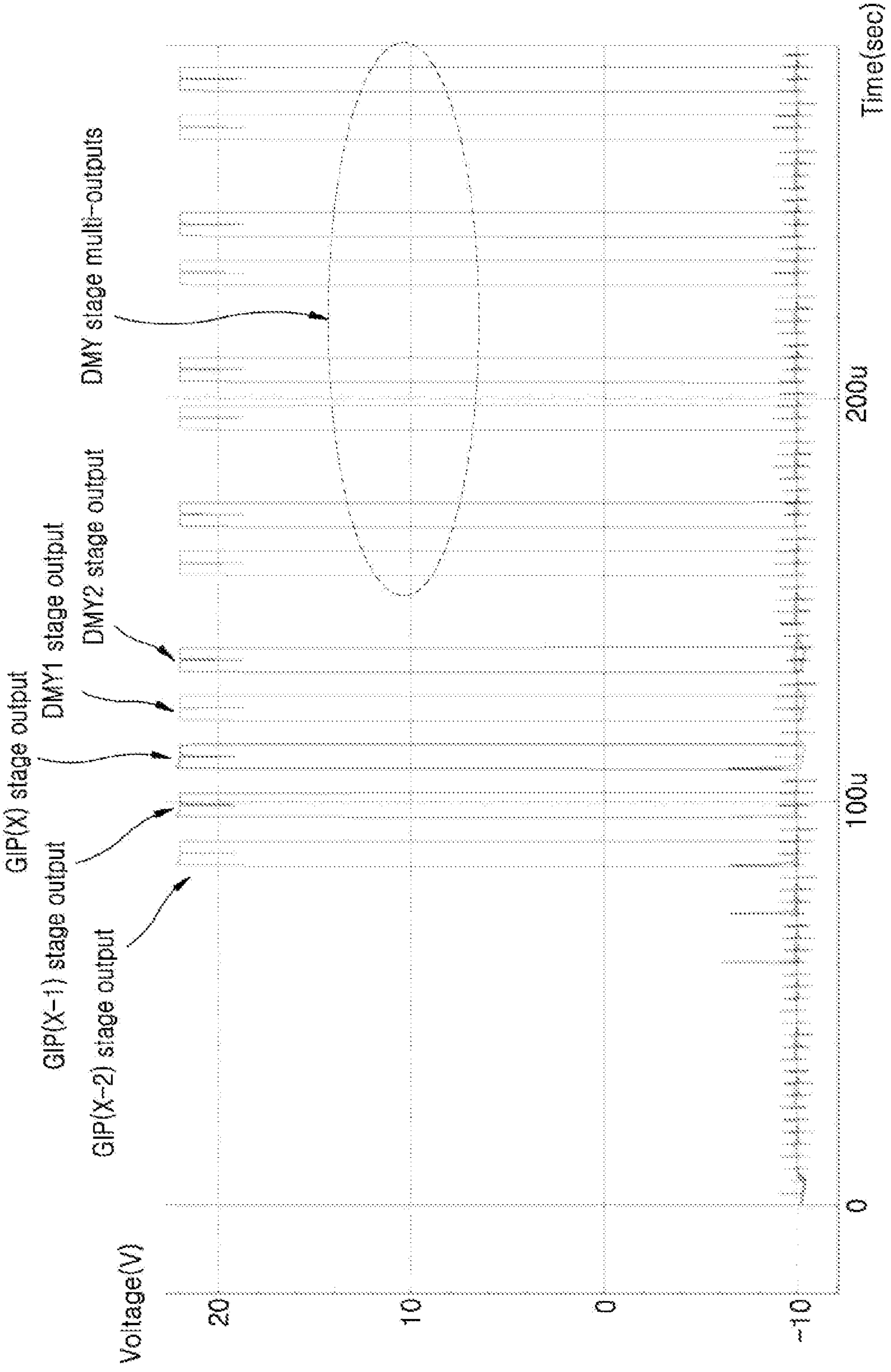
FIG. 5 is an output waveform diagram of a gate driver circuit according to one aspect of the present disclosure.

FIG. 3 is a block diagram showing a signal output from the stage of FIG. 2. FIG. 4 is a circuit diagram of the stage in FIG. 3. FIG. 5 is an output waveform diagram of a gate driver circuit according to one aspect.

Referring to FIG. 3 and FIG. 4, the X-th stage GIP(X) outputs a carry signal Carry(n) and a plurality of gate signals G(n), G(n+1), G(n+2), and G(n+3). The carry signal Carry (n) is used to reset the Q node of the (X−2)-th stage GIP(X−2), and is used to set the Q node and the Qb node of the second dummy stage DMY2. The gate signals G(n), G(n+1), G(n+2), and G(n+3) are applied to a gate line of the display panel to operate a pixel circuit.

The X-th stage GIP(X) is configured to receive a carry signal C(n−2) from the (X−2)-th stage GIP(X−2) as the set signal, and pull up the Q node thereof to a power voltage GVDD in response to the carry signal C(n−2). The X-th stage GIP(X) is configured to pull down the Qb node thereof to a base voltage GVSS2 in response to the carry signal C(n−2).

When the Q node and the Qb node of the X-th stage GIP(X) are set to the power voltage GVDD and the base voltage GVSS2, respectively, the X-th stage GIP(X) outputs the gate driving signals G(n), G(n+1), G(n+2), and G(n+3) based on clock signals SCCLK(n), SCCLK(n+1), SCCLK (n+2), and SCCLK(n+3).

The X-th stage GIP(X) is configured to receive a carry signal C(n+2) as a reset signal from the second dummy stage DMY2, and to pull down the Q node thereof to the base voltage GVSS2 in response to the carry signal C(n+2).

The X-th stage GIP(X) includes a reset circuit 10, a first set circuit 20 and a second set circuit 30.

The reset circuit 10 receives the carry signal C(n+2) from the second dummy stage DMY2, and pulls down the Q node to the base voltage GVSS2 in response to the carry signal C(n+2) to reset the Q node to the base voltage GVSS2.

The first set circuit 20 receives the carry signal C(n−2) from the (X−2)-th stage GIP(X−2), and pull ups the Q node to the power voltage GVDD in response to the carry signal C(n−2) to set the Q node to the power voltage GVDD.

The second set circuit 30 receives the carry signal C(n−2) from the (X−2)-th stage GIP(X−2), and operates to pull down the Qb node to the base voltage GVSS2 in response to the carry signal C(n−2) to set the Qb node to the base voltage GVSS2.

Each of the first dummy stage DMY1 and the second dummy stage DMY2 receives the set signal from the previous stage thereto and operates based on the received set signal. However, there is no stage subsequent thereto. Thus, each of the first dummy stage DMY1 and the second dummy stage DMY2 does not receive the reset signal. Thus, the Q node thereof is not reset. When the Q node is not reset, multiple outputs are generated in the dummy stage.

As the Q node of the dummy stage is not normally reset, the multiple outputs may occur as shown in FIG. 5. Such multi-outputs may apply a gate bias to a transistor of the reset circuit 10 of the previous stage thereto to bring about a phenomenon in which the element is deteriorated.

To improve this situation, a gate driver circuit according to another aspect is configured to prevent the multiple outputs of the dummy stage to prevent the malfunction due to deterioration of the element.

Figure 6:
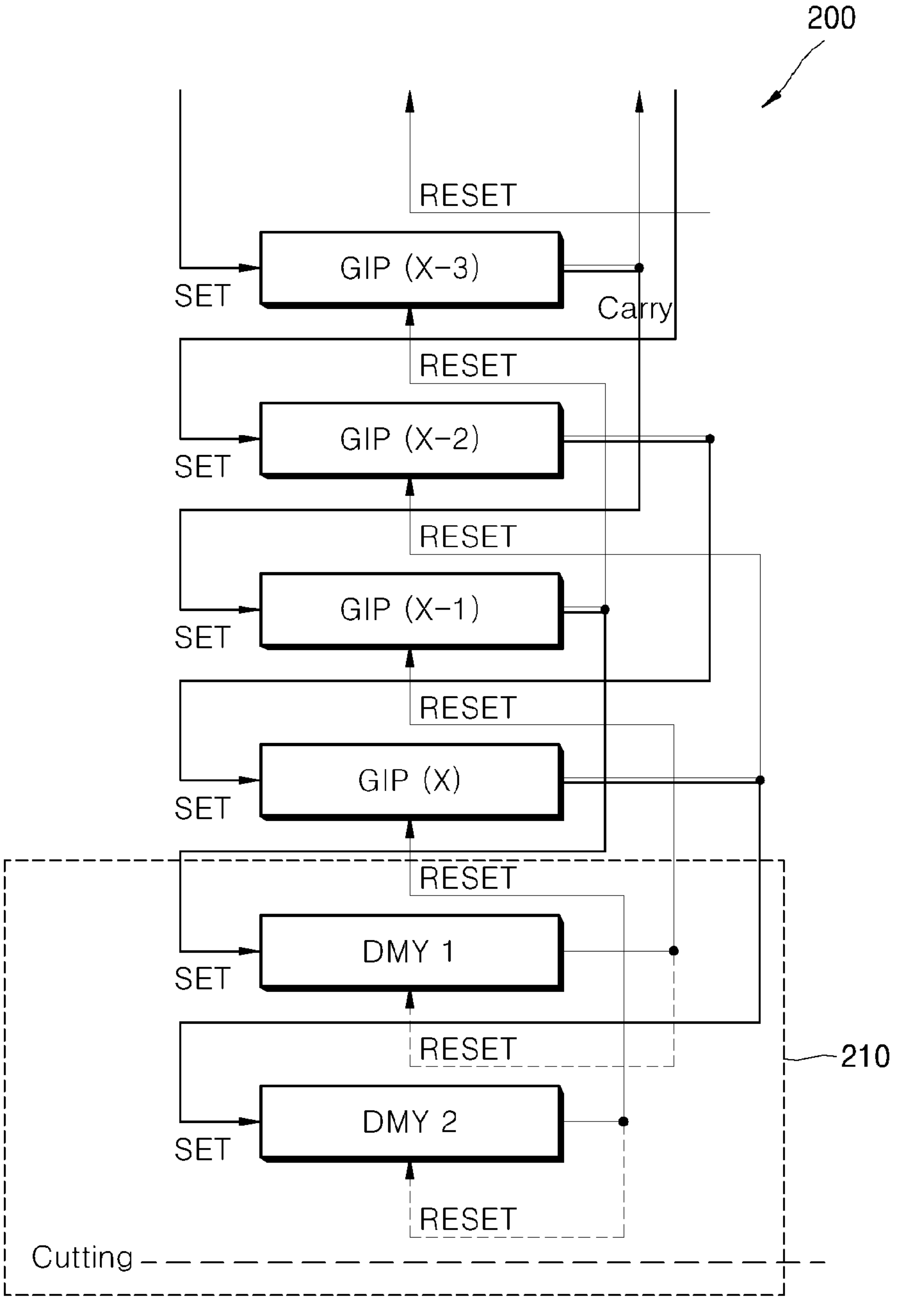
FIG. 6 is a block diagram of a gate driver circuit according to another aspect of the present disclosure.
Figure 7:
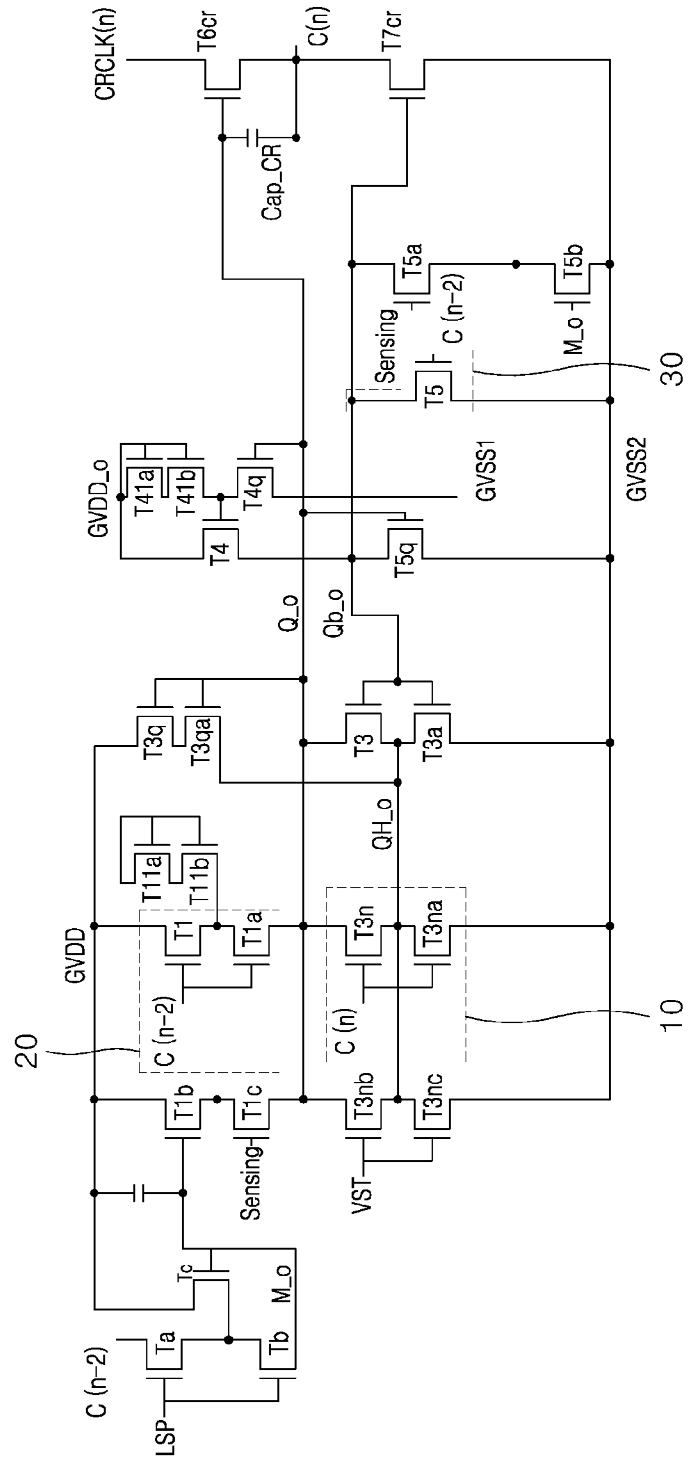
FIG. 7 is a circuit diagram of a dummy stage in FIG. 6.

FIG. 6 is a block diagram of a gate driver circuit according to another aspect. FIG. 7 is a circuit diagram of a dummy stage in FIG. 6. For convenience of illustration, 4 stages and 2 dummy stages are shown. However, the present disclosure is not limited thereto.

Referring to FIG. 6 and FIG. 7, the gate driver circuit 200 includes the (X−3)-th stage GIP(X−3), the (X−2)-th stage GIP(X−2), the (X−1)-th stage GIP(X−1), and the X-th stage GIP(X), and the dummy stage circuit 210. The dummy stage circuit 210 may include a first dummy stage DMY1 and a second dummy stage DMY2.

Each of the first dummy stage DMY1 and the second dummy stage DMY2 may receive an output signal C(n) thereof as a dummy carry signal C(n) for resetting an Q node thereof, and may reset the Q node thereof in response to the dummy carry signal C(n).

A cutting line may be preset in the display panel. Among the multiple stages, a stage including the reset circuit 10 that resets the Q node thereof in response to an output signal thereof may be set as a dummy stage. The cutting line may be set after the dummy stage. In one example, the cutting line may be set at a position after a position of each of the first dummy stage DMY1 and the second dummy stage DMY2, each including the reset circuit 10 that resets the Q node thereof in response to the output signal thereof.

In this way, the cutting line may be set at a position after a position of the dummy stage circuit 210 including the first dummy stage DMY1 and the second dummy stage DMY2 in the transparent display panel 100.

Each stage outputs the carry signal and the at least one gate signal G(n), G(n+1), G(n+2), and G(n+3). The dummy stage circuit 210 outputs the carry signal.

The (X−3)-th stage GIP(X−3) outputs the carry signal to the (X−1)-th stage GIP(X−1) as the set signal SET.

The (X−2)-th stage GIP(X−2) outputs the carry signal to the X-th stage GIP(X) as the set signal SET.

The (X−1)-th stage GIP(X−1) outputs the carry signal to the (X−3)-th stage GIP(X−3) as the reset signal RESET and outputs the carry signal to the first dummy stage DMY1 as the set signal SET.

The X-th stage GIP(X) outputs the carry signal as the reset signal RESET to the (X−2)-th stage GIP(X−2) and outputs the carry signal as the set signal SET to the first dummy stage DMY1.

The first dummy stage DMY1 outputs the carry signal as the reset signal RESET to the (X−1)-th stage GIP(X−1) and to the reset circuit 10 of the first dummy stage DMY1. The second dummy stage DMY2 outputs the carry signal to the X-th stage GIP(X) and the reset circuit 10 of the second dummy stage DMY2 as a reset signal RESET.

Each of the (X−3)-th stage GIP(X−3), the (X−2)-th stage GIP(X−2), the (X−1)-th stage GIP(X−1), and the X-th stage GIP(X) resets the Q node thereof to the base voltage GVSS2 in response to the reset signal RESET received from another stage.

Each of the (X−3)-th stage GIP(X−3), the (X−2)-th stage GIP(X−2), the (X−1)-th stage GIP(X−1), the X-th stage GIP(X), the first dummy stage DMY1 and the second dummy stage DMY2 is configured to pull up the Q node thereof to set the Q node to the power voltage GVDD in response to the carry signal received from the previous stage thereto, and is configured to pull down the Qb node thereof to set the Qb node to the base voltage GVSS2 in response to the carry signal received from the previous stage thereto.

Each of the (X−3)-th stage GIP(X−3), the (X−2)-th stage GIP(X−2), the (X−1)-th stage GIP(X−1) and the X-th stage GIP(X) is configured to pull down the Q node thereof to reset the Q node to the base voltage GVSS2 in response to the carry signal received from the stage subsequent thereto.

When the Q node and the Qb node of each of the (X−3)-th stage GIP(X−3), the (X−2)-th stage GIP(X−2), the (X−1)-th stage GIP(X−1) and the X-th stage GIP(X) are set to the power voltage GVDD and the base voltage GVSS2, respectively, each of the (X−3)-th stage GIP(X−3), the (X−2)-th stage GIP(X−2), the (X−1)-th stage GIP(X−1) and the X-th stage GIP(X) outputs the gate driving signals G(n), G(n+1), G(n+2), and G(n+3) based on the clock signals SCCLK(n), SCCLK(n+1), SCCLK(n+2) and SCCLK(n+3).

The first dummy stage DMY1 and the second dummy stage DMY2 respectively output the carry signal to the (X−1)-th stage GIP(X−1) and the X-th stage GIP(X) as the reset signal RESET to reset the Q node of each of the (X−1)-th stage GIP(X−1) and the X-th stage GIP(X) to the base voltage VSS2.

Each of the first dummy stage DMY1 and the second dummy stage DMY2 outputs the carry signal to the reset circuit 10 thereof to reset the Q node thereof to the base voltage VSS2.

Each of the first dummy stage DMY1 and the second dummy stage DMY2 includes a pull-up transistor T6cr, a pull-down transistor T7cr, the reset circuit 10, the first set circuit 20 and the second set circuit 30.

The pull-up transistor T6cr operates to pull-up an output in response to the Q node. The pull-up transistor T6cr is connected, at a source electrode thereof, to a clock line to which a carry clock signal CRCLK(n) is applied. A capacitor is further connected to and disposed between a gate electrode of the pull-up transistor T6cr and the output thereof.

The pull-down transistor T7cr operates to pull-down an output in response to the Qb node. The pull-down transistor T7cr is connected, at a source electrode thereof, to a base voltage line to which the base voltage GVSS2 is applied.

The reset circuit 10 resets the Q node in response to a dummy carry signal C(n) of the dummy stage itself. The reset circuit 10 is connected to and disposed between the Q node and the base voltage line to which the base voltage GVSS2 is applied.

The reset circuit 10 includes a first transistor T3n and a second transistor T3na which operate to pull down the Q node to the base voltage GVSS2 in response to the dummy carry signal C(n).

The first transistor T3n and the second transistor T3na are connected in series to each other and are disposed between and connected to the Q node and the base voltage line. In this regard, each of the first transistor T3n and the second transistor T3na has a smaller channel width than that of each of transistors of the reset circuit of the X-th stage GIP(X).

In one example, each of the first transistor T3n and the second transistor T3na has a channel width equal to 0.7 times of that of each of the transistors of the reset circuit of the X-th stage GIP(X). In another example, each of the first transistor T3n and the second transistor T3na has the channel width equal to 0.5 to 0.7 times of that of each of the transistors of the reset circuit of the X-th stage GIP(X).

In this way, in the aspect of the present disclosure, the dummy stage resets the Q node thereof using the carry signal of the dummy stage. Further, the channel width of the transistor of the reset circuit of the dummy stage is reduced to 0.5 to 0.7 times of the channel width of the transistor of the reset circuit of the stage that outputs the gate signal, thereby preventing the multi-outputs of the dummy stage. This prevents malfunction of the gate driver circuit due to deterioration of the transistor of the reset circuit of the previous stage thereto due to the multi-outputs.

The first set circuit 20 sets the Q node to the power voltage GVDD in response to the carry signal C(n−2). The first set circuit 20 is connected to and disposed between the power voltage line to which the power voltage GVDD is applied and the Q node. The first set circuit 20 includes a third transistor T1 and a fourth transistor T1a which operate to pull up the Q node to the power voltage GVDD in response to the carry signal C(n−2). The third transistor T1 and the fourth transistor T1a are connected in series between the power voltage line and the Q node.

The second set circuit 30 sets the Qb node to the base voltage GVSS2 in response to the carry signal C(n−2). The second set circuit 30 is connected to and disposed between the base voltage line to which the base voltage GVSS2 is applied and the Qb node, and includes a fifth transistor T5 operating to pull down the Qb node to the base voltage in response to the carry signal C(n−2).

When the Q node and the Qb node of each of the stages GIP(X−3), GIP(X−2), GIP(X−1), and GIP(X) are set to the power voltage GVDD and the base voltage GVSS2, respectively, each of the stages GIP(X−3), GIP(X−2), GIP(X−1), and GIP(X) sequentially outputs the gate signals G(n), G(n+1), G(n+2), and G(n+3) in response to the clock signals SCCLK(n), SCCLK(n+1), SCCLK(n+2), and SCCLK(n+3).

Each of the stages GIP(X−3), GIP(X−2), GIP(X−1), and GIP(X) and the dummy stages DMY1 and DMY2 further includes series-connected transistors T3nb and T3n configured to pull down the Q node thereof to the base voltage GVSS2 in response to a start signal VST.

Each of the stages GIP(X−3), GIP(X−2), GIP(X−1), and GIP(X) and the dummy stages DMY1 and DMY2 further include transistors T1b and T1c connected in series to each and disposed between and connected to the power voltage GVDD and the Q node. In this regard, the transistor T1b responds to a M node signal and the transistor T1c responds to a sensing signal to drive the Q node with the power voltage GVDD.

Each of the stages GIP(X−3), GIP(X−2), GIP(X−1), and GIP(X) and the dummy stages DMY1 and DMY2 further includes transistors Ta and Tb serially connected to each other and disposed between and connected to a terminal to which the carry signal is applied and a M node. The transistors Ta and Tb drive the M node with the carry signal in response to an LSP signal. The M node is connected to a gate electrode of transistor T1b and a gate electrode of the transistor Tc. The transistor Tc is connected to and disposed between an electrode between the transistors Ta and Tb and the power voltage GVDD. A capacitor is further connected to and disposed between the power voltage GVDD and the M node.

Further, each of the stages GIP(X−3), GIP(X−2), GIP(X−1), and GIP(X) and the dummy stages DMY1*a* and DMY2 further includes transistors T11a and T11b connected to and disposed between the power voltage GVSS2 and an electrode between the transistors T1 and T1a. Gate electrodes of the transistors T11a and T11b are connected to the power voltage GVSS2.

Further, each of the stages GIP(X−3), GIP(X−2), GIP(X−1), and GIP(X) and the dummy stages DMY1 and DMY2 further includes transistors T3 and T3a connected to and disposed between the Q node and the base voltage GVSS2. Gate electrodes of the transistors T3 and T3a are connected to the Qb node.

Further, each of the stages GIP(X−3), GIP(X−2), GIP(X−1), and GIP(X) and the dummy stages DMY1 and DMY2 further includes transistors T3q and T3qb connected to and disposed between the power voltage GVDD and a QH node. The transistors T3q and T3qb are connected in series to each other, while gate electrodes thereof are connected to the Q node. The QH node is connected to an electrode between the transistors T3 and T3a, an electrode between the transistors T3n and T3na, and an electrode between the transistors T3nb and T3nc.

Further, each of the stages GIP(X−3), GIP(X−2), GIP(X−1), and GIP(X) and the dummy stages DMY1 and DMY2 further includes a transistor T5q connected to and disposed between the Qb node and the base voltage GVSS2. A gate electrode of the transistor T5q is connected to the Q node.

Further, each of the stages GIP(X−3), GIP(X−2), GIP(X−1), and GIP(X) and the dummy stages DMY1 and DMY2 further includes a transistor T4 connected to and disposed between the power voltage GVDD and the Qb node, and transistors T41a, T41b, and T4q connected to and disposed between the power voltage GVDD and the base voltage GVSS1. Gate electrodes of the transistors T41a and T41b are connected to the power voltage GVDD, a gate electrode of the to an electrode between the transistors T41b and T4q.

Further, each of the stages GIP(X−3), GIP(X-Z), GIP(X−1), and GIP(X) and the dummy stages DMY1 and DMY2 further includes a transistor T5a and a transistor T5b connected in series to each other and disposed between and connected to the Qb node and the base voltage VSS2. In this regard, the transistor T5a operates in response to the sensing signal and the transistor T5b operates in response to the M node signal to drive the Qb node with the base voltage VSS2.

Further, each of the stages GIP(X−3), GIP(X-Z), GIP(X−1) and GIP(X) further includes pull-up transistors T6a, T6b, T6c, and T6d which pull up the output in response to the Q node, and pull-down transistors T7a, T7b, T7c, and T7d which pull down the output in response to the Qb node. Source electrodes of the pull-up transistors T6a, T6b, T6c and T6d are connected to the clock signals SCCLK(n), SCCLK(n+1), SCCLK(n+2) and SCCLK(n+3). Source electrodes of the pull-down transistors T7a, T7b, T7c, and T7d are connected to the base voltage GVSS0.

Each of the stages GIP(X−3), GIP(X-Z), GIP(X−1) and GIP(X) output the gate signals G(n), G(n)+1, G(n+2), and G(n+3) based on the clock signals SCCLK(n), SCCLK(n+l), SCCLK(n+2), and SCCLK(n+3).

Figure 8:
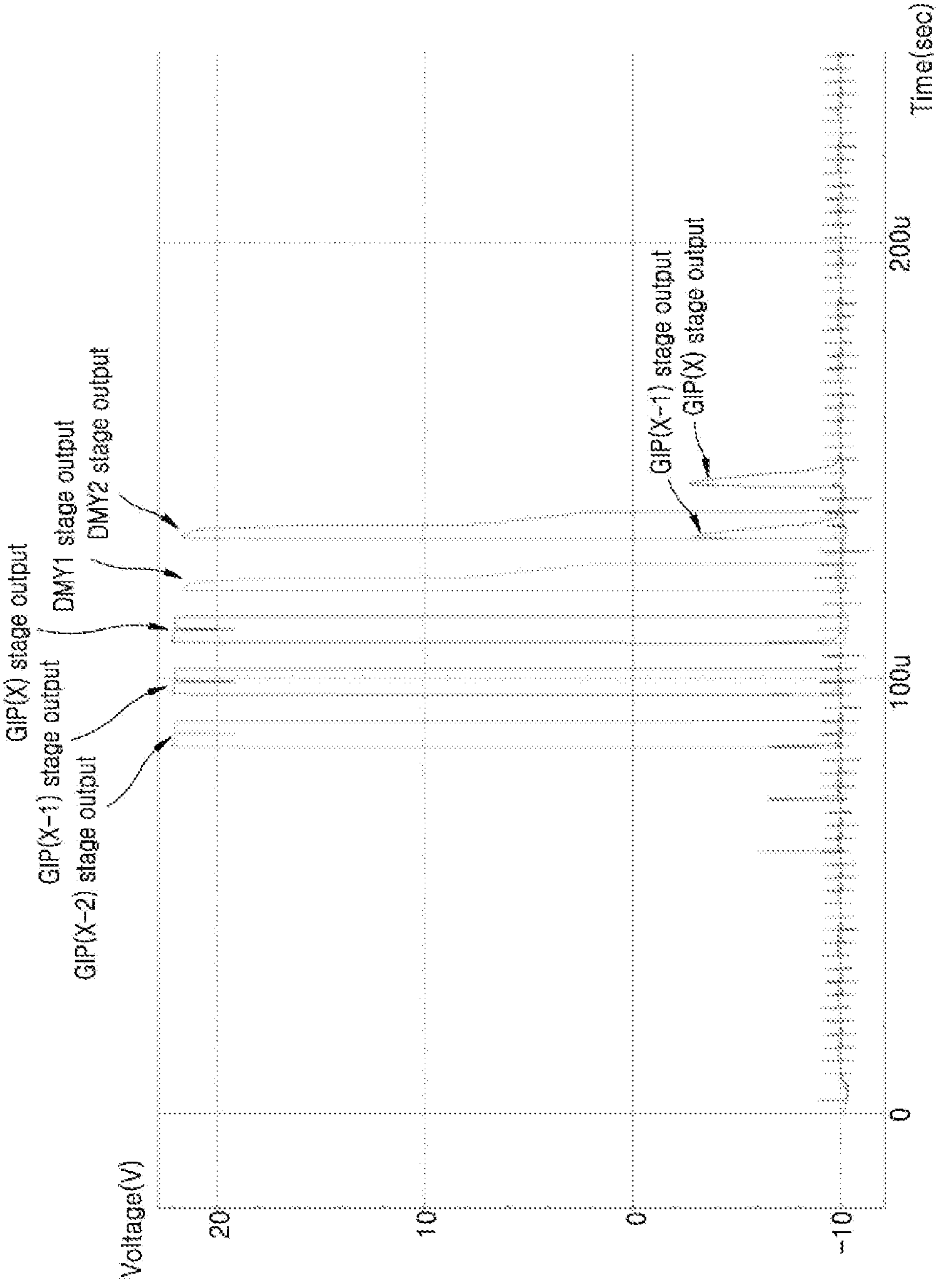
FIG. 8 to FIG. 10 show the output waveform diagrams based on a size of a channel width of a transistor of a reset circuit of FIG. 7.
Figure 9:
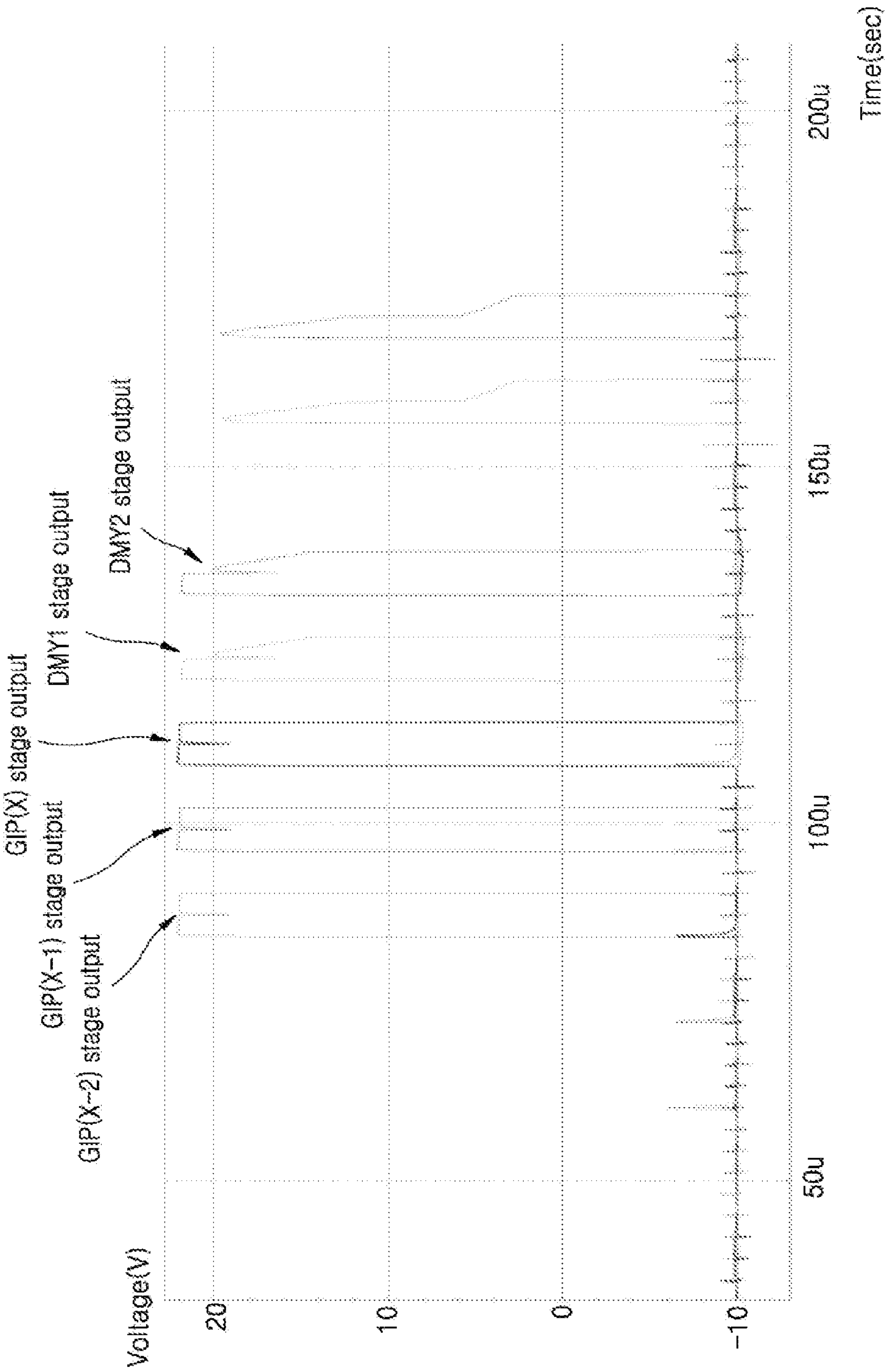
Figure 10:
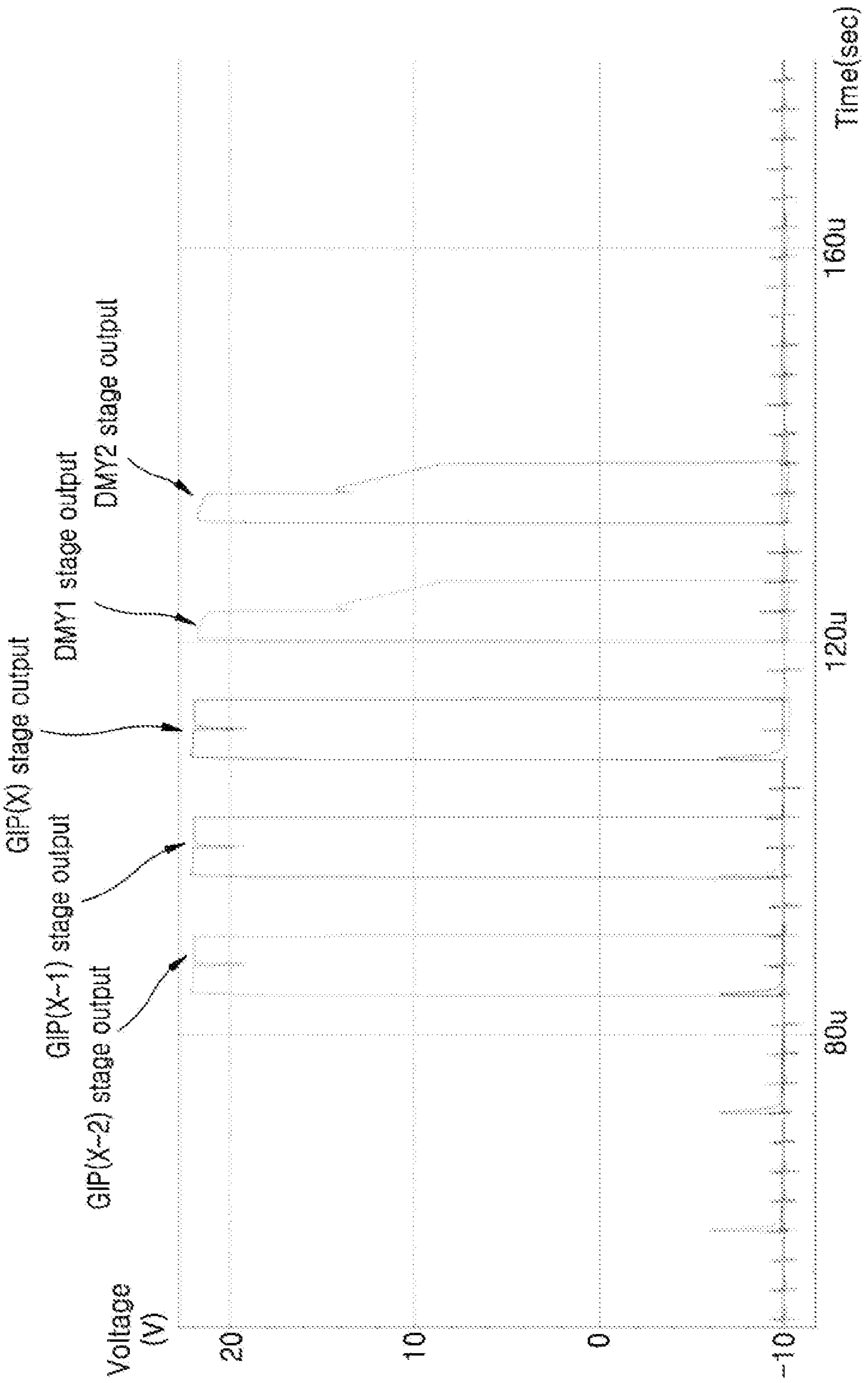

FIG. 8 to FIG. 10 are output waveform diagrams based on a size of a channel width of a transistor of the reset circuit of FIG. 7.

FIG. 8 shows an output waveform diagram in an example where the channel width of the transistor of the reset circuit 10 of each of the dummy stages DMY1 and DMY2 as shown in FIG. 7 is equal to the channel width of the transistor of the reset circuit of each of the stages GIP(X), GIP(X−1) and GIP(X1Z). In this case, it may be identified that only one output of the FIG. 9 shows an output waveform diagram in an example where the channel width of the transistor of the reset circuit 10 of each of the dummy stages DMY1 and DMY2 as shown in FIG. 7 is equal to 0.5 times of the channel width of the transistor of the reset circuit of each of the stages GIP(X), GIP(X−1) and GIP(X−2). In this case, it may be identified that there is no problem in terms of the output of the stage. However, two outputs of the dummy stage occur. However, the outputs of the dummy stage do not affect the display.

FIG. 10 shows an output waveform diagram in an example where the channel width of the transistor of the reset circuit 10 of each of the dummy stages DMY1 and DMY2 as shown in FIG. 7 is equal to 0.7 times of the channel width of the transistor of the reset circuit of each of the stages GIP(X), GIP(X−1) and GIP(X−2). In this case, it may be identified that there is no problem in terms of the output of the stage. Multiple outputs do not occur from the dummy stage.

Figure 11:
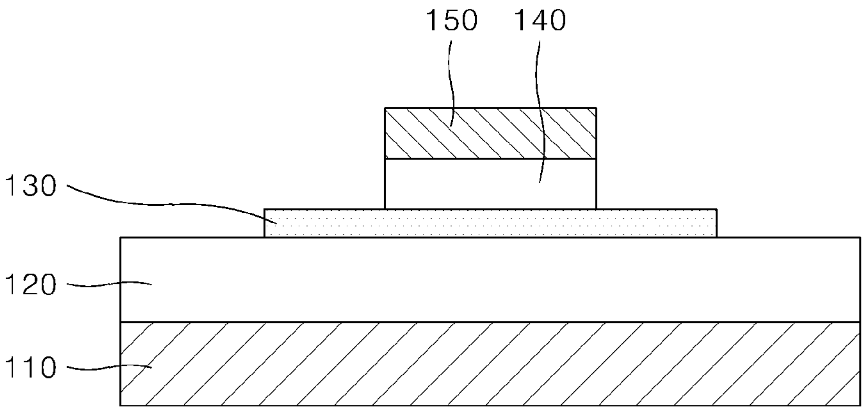
FIG. 11 and FIG. 12 are respectively a cross-sectional and a plan view of the transistor of the reset circuit of FIG. 7.
Figure 12:
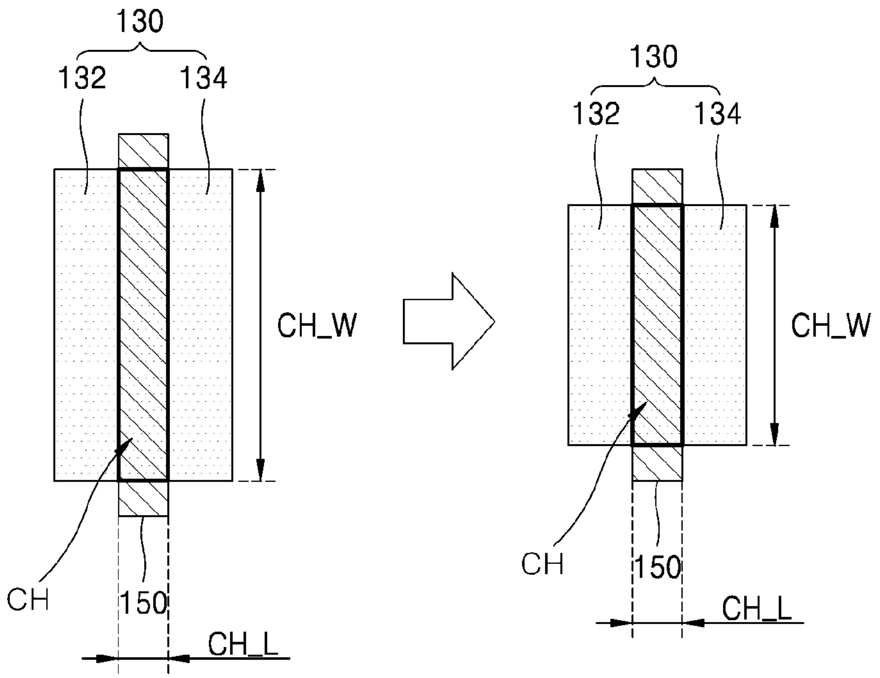

FIGS. 11 and 12 are cross-sectional and plan views of the transistor of the reset circuit 10 of FIG. 7, respectively. The transistor of the reset circuit 10 May be at least one of the first transistor T3n and the second transistor T3na. The first transistor T3n and the second transistor T3na are thin film transistors.

The display panel may include a substrate 110, a buffer layer 120, and a plurality of thin film transistors. The buffer layer 120 may be disposed on the substrate 110, and the thin film transistor may be disposed on the buffer layer 120.

The substrate 110 supports various components of the display panel 100 thereon. The substrate 110 may be made of a transparent insulating material, such as glass or plastic. When the substrate 110 is made of the plastic, the substrate may be referred to as a plastic film or a plastic substrate. For example, the substrate 110 may be in a form of a film made of one of polyimide-based polymers, polyester-based polymers, silicone-based polymers, acryl-based polymers, polyolefin-based polymers, and copolymers thereof. However, aspects of the present disclosure are not limited thereto.

The buffer layer 120 may delay diffusion of moisture and/or oxygen that has invaded the substrate 110. The buffer layer 120 may protect the semiconductor layer 130 and may block various types of defects flowing from the substrate 110.

The thin film transistor may include a semiconductor layer 130, a gate insulating layer 140, and a gate electrode 150. The semiconductor layer 130 may include a source area 132, a drain area 134, and a channel area CH.

The semiconductor layer 130 may be made of polysilicon (p-Si). In this case, a predetermined area thereof may be doped with impurities. Additionally, the semiconductor layer 130 may be made of amorphous silicon (a-Si) or various organic semiconductor materials such as pentacene. The semiconductor layer 130 may be made of oxide. Aspects of the present disclosure are not limited to the material constituting the semiconductor layer 130. The semiconductor layer 130 may be an active layer. However, the present disclosure is not limited to this term.

The gate electrode 150 may be disposed on top of the semiconductor layer 130. The gate electrode 150 may be made of various conductive materials, such as magnesium (Mg), aluminum (Al), nickel (Ni), chromium (Cr), molybdenum (Mo), tungsten (W), gold (Au), or an alloy thereof. Aspects of the present disclosure are not limited thereto.

The gate insulating layer 140 may be disposed between the semiconductor layer 130 and the gate electrode 150. The gate insulating layer 140 may insulate the semiconductor layer 130 and the gate electrode 150 from each other and may be made of an insulating material. For example, the gate insulating layer 140 may be composed of a single or double layer made of silicon oxide ($SiO_x$) or silicon nitride ($SiN_x$). However, the present disclosure is not limited thereto.

The source area 132 and the drain area 134 of the semiconductor layer 130 may be electrically connected to a source electrode (not shown) and a drain electrode (not shown), respectively, and the source area 132 and the drain area 134 may be spaced apart from each other.

The channel area CH of the semiconductor layer 130 may be formed in an area overlapping the gate electrode 150 and disposed between the source area 132 and the drain area 134. The channel area CH may have a length CH_L and a width CH_W and may overlap the gate electrode 150. The channel length CH_L may be defined as a spacing between the source area 132 and the drain area 134. The channel width CH_W may be defined as a dimension perpendicular to the channel length CH_L direction and overlapping with the gate electrode 150.

Each of the first transistor T3n and the second transistor T3na of the reset circuit 10 may be formed to have a smaller channel width than that of each of transistors of a reset circuit of an X-th stage GIP(X). For example, each of the first transistor T3n and the second transistor T3na may be formed to have the channel width of 0.5 to 0.7 times of that of each of the transistors of the reset circuit of the X stage GIP(X).

The gate driver circuit of the present disclosure may be described as follows.

The gate driver circuit 200 according to one aspect of the present disclosure includes a plurality of stages GIP(X−3), GIP(X−2), GIP(X−1), GIP(X), DMY1, and DMY2 for driving a plurality of gate lines. The plurality of stages includes a X-th stage GIP(X) outputting a carry signal C(n−2) and at least one gate signal G(n), G(n+1), G(n+2), G(n+3), and a dummy stage DMY1 which outputs a dummy carry signal C(n) to the X-th stage GIP(X), and resets the dummy stage in response to the dummy carry signal C(n).

The dummy stage DMY1 includes a pull-up transistor T6cr configured to pull-up an output in response to the Q node, a pull-down transistor T7cr configured to pull-down the output in response to the Qb node, and a reset circuit 10 configured to reset the Q node in response to the dummy carry signal C(n).

The reset circuit 10 includes the first transistor T3n and the second transistor T3na that are connected to and disposed between the Q node and the base voltage line to which the base voltage GVSS2 is applied, wherein the first transistor T3n and the second transistor T3na configured to pull down the Q node to the base voltage GVSS2 in response to the dummy carry signal C(n).

The first transistor T3n and the second transistor T3na are connected in series to each other and disposed between and connected to the Q node and the base voltage line.

Each of the first transistor T3n and the second transistor T3na have a smaller channel width than that of each of the transistors of the reset circuit of the X-th stage GIP(X).

Each of the first transistor T3n and the second transistor T3na has a channel width equal to 0.5 to 0.7 times of that of each of the transistors of the reset circuit of the X-th stage GIP(X).

The dummy stage DMY1 further includes: a first set circuit 20 configured to set the Q node to a power voltage GVDD in response to the carry signal C(n−2), and a second set circuit 30 configured to set the Qb node to a base voltage GVSS2 in response to the carry signal C(n−2).

The first set circuit 20 includes a third transistor T1 and a fourth transistor T1a connected to and disposed between a power voltage line to which the power voltage GVDD is applied and the Q node, wherein the third transistor T1 and the fourth transistor T1a are configured to pull up the Q node to the power voltage GVDD in response to the carry signal C(n−2).

The third transistor T1 and the fourth transistor T1a are connected in series to each other and disposed between and connected to the power voltage line and the Q node.

The second set circuit 30 includes a fifth transistor T5 connected to and disposed between a base voltage line to which the base voltage GVSS2 is applied and the Qb node, wherein the fifth transistor T5 is configured to pull down the Qb node to the base voltage in response to the carry signal C(n−2).

The fifth transistor T5 sets the Qb node to the base voltage in response to the carry signal C(n−2).

A source electrode of the pull-up transistor T6cr is connected to a clock line to which a carry clock signal CRCLK (n) is applied, wherein a source electrode of the pull-down transistor T7cr is connected to a base voltage line to which the base voltage GVSS2 is applied.

The gate driver circuit 200 according to another aspect of the present disclosure includes a (X−1)-th stage GIP(X−1) configured to output a (X−1)-th carry signal and at least one (X−1)-th gate signal; an X-th stage GIP(X) configured to output an X-th carry signal and at least one X-th gate signal; a first dummy stage DMY1 configured to output a first dummy carry signal to the (X−1)-th stage GIP(X−1) in response to the (X−1)-th carry signal, and to reset the first dummy stage DMY1 in response to the first dummy carry signal; and a second dummy stage DMY2 configured to output a second dummy carry signal to the X-th stage GIP(X) in response to the X-th carry signal and to reset the second dummy stage DMY2 in response to the second dummy carry signal.

The transparent display device according to still another aspect of the present disclosure includes the cuttable transparent display panel 100; and the gate driver circuit 200 configured to drive gate lines of the display panel, wherein the gate driver circuit 200 includes a plurality of stages GIP(X−3), GIP(X−2), GIP(X−1), GIP(X), DMY1, and DMY2 for driving a plurality of gate lines. The plurality of stages includes a X-th stage GIP(X) outputting a carry signal C(n−2) and at least one gate signal G(n), G(n+1), G(n+2), G(n+3), and a dummy stage DMY1 which outputs a dummy carry signal C(n) to the X-th stage GIP(X), and resets the dummy stage in response to the dummy carry signal C(n).

The transparent display device according to still yet another aspect of the present disclosure includes the cuttable transparent display panel 100; and the gate driver circuit 200 configured to drive gate lines of the display panel, wherein the gate driver circuit 200 includes a (X−1)-th stage GIP (X−1) configured to output a (X−1)-th carry signal and at least one (X−1)-th gate signal; an X-th stage GIP(X) configured to output an X-th carry signal and at least one X-th gate signal; a first dummy stage DMY1 configured to output a first dummy carry signal to the (X−1)-th stage GIP(X−1) in response to the (X−1)-th carry signal, and to reset the first dummy stage DMY1 in response to the first dummy carry signal; and a second dummy stage DMY2 configured to output a second dummy carry signal to the X-th stage GIP(X) in response to the X-th carry signal and to reset the second dummy stage DMY2 in response to the second dummy carry signal.

When cutting the transparent display panel 100, the gate driver circuit 200 embedded therein is also cut.

In the transparent display panel 100, a cutting line may be set at a position after a position of the dummy stage circuit 210 including the first dummy stage DMY1 and the second dummy stage DMY2.

According to the foregoing aspects, the gate driver circuit 200 may be prevented from malfunctioning in cutting the transparent display panel 100. Thus, output stability and reliability thereof may be secured.

According to the aspects and the aspects, the multiple outputs of the dummy stage may be prevented to prevent malfunction of the gate driver circuit due to deterioration of the element.

Further, a separate global reset line for resetting the stages is not required. Thus, a size of a bezel of the display panel may be reduced.

Further, no global reset line is required, such that interference noise may be reduced, thereby ensuring output stability.

A cuttable gate driver circuit 200 in which multiple outputs of the dummy stage may be prevented to secure output stability, and the transparent display device including the cuttable gate driver circuit may be provided.

Further, a transmissive area of the transparent display panel in the transparent display device may be increased.

Further, multiple outputs of the dummy stage may be prevented such that the power consumption may be reduced, and thus the display panel may operate at low power.

Further, the cutting may allow the last stage of at least one of the stages of the gate driver circuit 200 to be used as the dummy stage.

Although the aspects of the present disclosure have been described in more detail with reference to the accompanying drawings, the present disclosure is not necessarily limited to these aspects, and may be modified in various manners within the scope of the technical spirit of the present disclosure. Accordingly, the aspects as disclosed in the present disclosure are intended to describe rather than limit the technical idea of the present disclosure, and the scope of the technical idea of the present disclosure is not limited by these aspects. Therefore, it should be understood that the aspects as described above are not restrictive but illustrative in all respects.

It will be apparent to those skilled in the art that various modifications and variations can be made in the gate driver circuit and a transparent display device including the same of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A gate driver circuit comprising:

a plurality of stages sequentially arranged for driving a plurality of gate lines, wherein each of the plurality of stages includes:

an X-th stage configured to output a carry signal and at least one gate signal, where X is an integer equal to or greater than 2; and a dummy stage configured to output a dummy carry signal to the X-th stage in response to the carry signal, wherein the dummy stage is configured to reset the dummy stage in response to the dummy carry signal, and includes at least one reset transistor having a channel width smaller than a channel width of a reset transistor included in the X-th stage.

2. The gate driver circuit of claim 1, wherein the dummy stage includes:

a pull-up transistor configured to pull-up an output in response to a Q node;

a pull-down transistor configured to pull-down the output in response to a Qb node; and a reset circuit configured to reset the Q node in response to the dummy carry signal.

3. The gate driver circuit of claim 2, wherein the reset circuit includes a first transistor and a second transistor connected to and disposed between the Q node and a base voltage line to which a base voltage is applied, and wherein the first transistor and the second transistor are configured to pull down the Q node to the base voltage in response to the dummy carry signal.

4. The gate driver circuit of claim 3, wherein the first transistor and the second transistor are connected in series with each other and disposed between and connected to the Q node and the base voltage line.

5. The gate driver circuit of claim 3, wherein each of the first transistor and the second transistor has a smaller channel width than a channel width of each of transistors of a reset circuit of the X-th stage.

6. The gate driver circuit of claim 5, wherein each of the first transistor and the second transistor has the channel width equal to 0.5 to 0.7 times of the channel width of each of the transistors of the reset circuit of the X-th stage.

7. The gate driver circuit of claim 2, wherein the dummy stage further includes:

a first set circuit configured to set the Q node to a power voltage in response to the carry signal; and a second set circuit configured to set the Qb node to a base voltage in response to the carry signal.

8. The gate driver circuit of claim 7, wherein the first set circuit includes a third transistor and a fourth transistor connected to and disposed between a power voltage line to which the power voltage is applied and the Q node, and wherein the third transistor and the fourth transistor are configured to pull up the Q node to the power voltage in response to the carry signal.

9. The gate driver circuit of claim 8, wherein the third transistor and the fourth transistor are connected in series with each other and disposed between and connected to the power voltage line and the Q node.

10. The gate driver circuit of claim 7, wherein the second set circuit includes a fifth transistor connected to and disposed between a base voltage line to which the base voltage is applied and the Qb node, and wherein the fifth transistor is configured to pull down the Qb node to the base voltage.

11. The gate driver circuit of claim 10, wherein the fifth transistor is configured to set the Qb node to the base voltage in response to the carry signal.

12. The gate driver circuit of claim 2, wherein the pull-up transistor has a source electrode connected to a clock line to which a carry clock signal is applied, wherein the pull-down transistor has a source electrode connected to a base voltage line to which a base voltage is applied.

13. A gate driver circuit comprising:

a plurality of stages sequentially arranged for driving a plurality of gate lines, wherein each of the plurality of stages includes:

a (X−1)-th stage configured to output a (X−1)-th carry signal and at least one (X−1)-th gate signal, where X is an integer equal to or greater than 2;

an X-th stage configured to output an X-th carry signal and at least one X-th gate signal;

a first dummy stage configured to output a first dummy carry signal to the (X−1)-th stage in response to the (X−1)-th carry signal, and to reset the first dummy stage in response to the first dummy carry signal, the first dummy stage including at least one reset transistor having a channel width smaller than a channel width of a reset transistor included in the (X−1)-th stage; and a second dummy stage configured to output a second dummy carry signal to the X-th stage in response to the X-th carry signal and to reset the second dummy stage in response to the second dummy carry signal, the second dummy stage including at least one reset transistor having a channel width smaller than a channel width of a reset transistor included in the X-th stage.

14. The gate driver circuit of claim 13, wherein each of the first dummy stage and the second dummy stage includes:

a pull-up transistor configured to pull-up an output in response to a Q node;

a pull-down transistor configured to pull-down the output in response to a Qb node; and a reset circuit configured to reset the Q node in response to the first dummy carry signal or the second dummy carry signal.

15. The gate driver circuit of claim 14, wherein the reset circuit includes a first transistor and a second transistor connected to and disposed between the Q node and a base voltage line to which a base voltage is applied, wherein the first transistor and the second transistor are configured to pull down the Q node to the base voltage in response to the first dummy carry signal or the second dummy carry signal.

16. The gate driver circuit of claim 15, wherein each of the first transistor and the second transistor has a smaller channel width than a channel width of each of transistors of a reset circuit of each of the (X−1)-th stage and the X-th stage.

17. The gate driver circuit of claim 16, wherein each of the first transistor and the second transistor has the channel width equal to 0.5 to 0.7 times of the channel width of each of the transistors of the reset circuit of each of the (X−1)-th stage and the X-th stage.

18. The gate driver circuit of claim 14, wherein each of the first dummy stage and the second dummy stage includes:

a first set circuit configured to set the Q node to a power voltage in response to the (X−1)-th carry signal or the X-th carry signal; and a second set circuit configured to set the Qb node to a base voltage in response to the (X−1)-th carry signal or the X-th carry signal.

19. The gate driver circuit of claim 18, wherein the first set circuit includes a third transistor and a fourth transistor connected to and disposed between a power voltage line to which the power voltage is applied and the Q node, wherein the third transistor and the fourth transistor are configured to pull up the Q node to the power voltage in response to the (X−1)-th carry signal or the X-th carry signal, and wherein the second set circuit includes a fifth transistor connected to and disposed between a base voltage line to which the base voltage is applied and the Qb node, wherein the fifth transistor is configured to pull down the Qb node to the base voltage in response to the (X−1)-th carry signal or the X-th carry signal.

20. A transparent display device comprising:

a cuttable transparent display panel; and a gate driver circuit configured to drive gate lines of the display panel, wherein the gate driver circuit includes the gate driver circuit according to claim 1.

21. The transparent display device of claim 20, wherein in the transparent display panel, a cutting line is set at a position after a position of the dummy stage.

* * * * *